United States Patent
Lau et al.

(10) Patent No.: US 11,384,196 B2
(45) Date of Patent: Jul. 12, 2022

(54) FIRE RETARDANT COMPOSITIONS

(71) Applicant: Nano and Advanced Materials Institute Limited, Hong Kong (CN)

(72) Inventors: Yeuk Tin Lau, Hong Kong (CN); Wei Li, Hong Kong (CN); Shing Hang Ng, Hong Kong (CN); Kin Hang Ken Ng, Hong Kong (CN); Xin Shi, Hong Kong (CN)

(73) Assignee: Nano and Advanced Materials Institute Limited, Hong Kong (CN)

( * ) Notice: Subject to any disclaimer, the term of this patent is extended or adjusted under 35 U.S.C. 154(b) by 502 days.

(21) Appl. No.: 16/381,025

(22) Filed: Apr. 11, 2019

(65) Prior Publication Data

US 2019/0315911 A1 Oct. 17, 2019

Related U.S. Application Data

(60) Provisional application No. 62/761,903, filed on Apr. 12, 2018.

(51) Int. Cl.
| | |
|---|---|
| *C08G 59/42* | (2006.01) |
| *C08K 3/016* | (2018.01) |
| *C08K 3/22* | (2006.01) |
| *C08L 63/00* | (2006.01) |
| *C09D 5/18* | (2006.01) |

(52) U.S. Cl.
CPC .......... *C08G 59/4207* (2013.01); *C08K 3/016* (2018.01); *C08K 3/22* (2013.01); *C08L 63/00* (2013.01); *C09D 5/185* (2013.01); *C08K 2003/2224* (2013.01); *C08K 2003/2227* (2013.01); *C08K 2201/005* (2013.01); *C08L 2201/02* (2013.01)

(58) Field of Classification Search
CPC ................................ A62C 2/065; C09D 5/185
See application file for complete search history.

(56) References Cited

U.S. PATENT DOCUMENTS

| | | | |
|---|---|---|---|
| 2,755,260 A | 7/1956 | Stilbert, Jr. et al. | |
| 3,130,096 A | 4/1964 | Pruitt et al. | |
| 4,198,328 A * | 4/1980 | Bertelli | C09D 5/185 |
| | | | 523/179 |
| 4,229,329 A | 10/1980 | Bennett | |
| 6,881,256 B2 | 4/2005 | Orange et al. | |
| 7,429,290 B2 | 9/2008 | Lally | |
| 8,932,497 B2 | 1/2015 | Gupta et al. | |

(Continued)

FOREIGN PATENT DOCUMENTS

| | | |
|---|---|---|
| CN | 102276215 A | 12/2011 |
| CN | 102585652 A | 7/2012 |

(Continued)

OTHER PUBLICATIONS

Huntsman "Advanced Materials—High Performance Components" (Year: 2010).*
Orion "Specialty Carbon Blacks" (Year: 2019).*

*Primary Examiner* — Peter F Godenschwager
(74) *Attorney, Agent, or Firm* — Spruson & Ferguson (Hong Kong) Limited (57) ABSTRACT

The present disclosure provides a fire retardant composition that includes a non-intumescent composition and an intumescent composition, fire retardant coatings including the same, and methods of preparation and use thereof.

18 Claims, 1 Drawing Sheet

(56) References Cited

U.S. PATENT DOCUMENTS

| | | | | |
|---|---|---|---|---|
| 2004/0031416 A1* | 2/2004 | Smart | ................ | C09D 1/02 |
| | | | | 106/18.12 |
| 2008/0251273 A1* | 10/2008 | Brown | ................ | H01B 7/295 |
| | | | | 174/113 R |
| 2018/0241190 A1 | 8/2018 | Gyppaz et al. | | |

FOREIGN PATENT DOCUMENTS

| | | |
|---|---|---|
| CN | 102153364 B | 8/2013 |
| CN | 102659362 B | 10/2013 |
| CN | 103640310 A | 3/2014 |
| CN | 104387982 A | 3/2015 |
| CN | 103104046 B | 9/2015 |
| CN | 105017961 A | 11/2015 |
| CN | 105419509 A | 3/2016 |
| CN | 105670400 A | 6/2016 |
| CN | 105694573 A | 6/2016 |
| CN | 106010261 A | 10/2016 |
| CN | 106046968 A | 10/2016 |
| CN | 106243854 A | 12/2016 |
| CN | 106398458 A | 2/2017 |
| EP | 2093263 A1 | 8/2009 |
| WO | 1992/008760 A1 | 5/1992 |

\* cited by examiner

FIRE RETARDANT COMPOSITIONS

CROSS-REFERENCE TO RELATED APPLICATIONS

This application claims the benefit of priority of U.S. Provisional Application No. 62/761,903, filed on Apr. 12, 2018, the contents of which being hereby incorporated by reference in their entirety for all purposes.

TECHNICAL FIELD

The present disclosure relates to compositions useful in the production of fire retardant coatings and/or materials, methods of production thereof, and fire retardant coatings and/or materials comprising the same.

BACKGROUND

For fire safety reasons, fire retardant coatings are commonly required by woods and plastics used for household furniture and electric appliances, and by concretes and steels used for constructions and buildings. Woods and plastics are flammable, and the strength of steels and concrete may significantly be weakened at high temperature, which may result in structural damage of buildings made therefrom.

Existing fire retardant coatings may have limitations, such as a narrow operative temperature range (e.g. only applicable at medium to high temperature or only applicable at low temperature), a narrow operative material range (e.g. only applicable on concrete or only applicable on woods and plastics), and environmentally unfriendly. In addition, commonly used fire retardant coatings are either aesthetically appealing yet with poor fire retardancy (e.g. fire retardant paintings), or have good fire retardancy yet aesthetically unattractive (e.g. cement-based fire retardant coatings). Other fire retardants, such as halogenated fire retardants, especially brominated fire retardants, cause serious environmental problems by releasing toxic gases during burning.

On the other hand, the accumulation of solid waste (such as industrial slag, fly ash, desulfurization ash, broken glasses, and mine tailings) on Earth poses serious dangers to public health and contributes to pollution. However, elimination and/or exploitation of solid waste is technically and economically challenging.

Therefore, there is a need for compositions useful in the production of fire retardant coatings that have a wide operative temperature range, a wide operative material range, and are environmentally friendly and aesthetically appealing. There is also a need for methods for preparing such compositions that utilize environmentally hazardous solid wastes and turn the same into fire retardant coatings in a cost-effective manner.

SUMMARY

Provided herein are improved fire retardant compositions that can be readily prepared from solid waste materials and commercially available materials. Also provided herein are fire retardant coatings made from the fire retardant compositions that can have a wide operative temperature range, a wide operative material range, and are environmentally friendly and aesthetically appealing.

In a first aspect of the present disclosure, provided herein is a fire retardant composition comprising at least one non-intumescent composition and at least one intumescent composition, wherein: the at least one non-intumescent composition comprises a curable binder composition, at least one non-intumescent fire retardant ingredient, and at least one reaction enhancing additive; and the at least one intumescent composition comprises a curable binder composition, at least one intumescent fire retardant ingredient, and at least one inorganic filler.

In a first embodiment of the first aspect, the curable binder composition comprises a curing agent and a resin.

In a second embodiment of the first aspect, the curing agent is an aliphatic amine based curing agent with a viscosity of about 5,000-about 15,000 centipoise at 25° C.

In a third embodiment of the first aspect, the resin is a waterborne epoxy resin with a viscosity of about 400-about 750 centipoise at 25° C.

In a fourth embodiment of the first aspect, the at least one non-intumescent fire retardant ingredient is a solid waste material.

In a fifth embodiment of the first aspect, the at least one intumescent fire retardant ingredients are selected from the group consisting of a carbon-source agent, a blowing agent, an acid-source agent, and combinations thereof.

In a sixth embodiment of the first aspect, the at least one inorganic filler is a metal hydroxide with an average particle size of about 10 nm-about 500 nm.

In a seventh embodiment of the first aspect, the fire retardant composition further comprises an anti-weathering composition.

In an eighth embodiment of the first aspect, the non-intumescent composition comprises about 1.6%-about 9.9% by weight curable binder composition, about 0.3%-about 76.0% by weight non-intumescent ingredients, and about 2.0%-about 30.4% by weight reaction enhancing additive; and the intumescent composition comprises about 6.2%-about 26.9% by weight curable binder composition, about 11.8%-about 56.0% by weight intumescent ingredients, and about 0.4%-about 8.8% by weight inorganic filler.

In a ninth embodiment of the first aspect, the inorganic filler has an average particle size of about 10 nm-about 500 nm.

In a tenth embodiment of the first aspect, the non-intumescent composition comprises about 1.6%-about 2.8% by weight curing agent, about 4.1%-about 7.1% by weight resin, about 39.5%-about 65.7% by weight fly ash, about 0.3%-about 10.3% by weight slag, about 2.0%-about 2.8% by weight alkali metal hydroxide, and about 14.4%-about 27.6% by weight alkali metal silicate solution; and the intumescent composition comprises about 6.2%-about 6.6% by weight curing agent, about 15.3%-about 16.7% by weight resin, about 11.8%-about 13.0% by weight carbon-source agent, about 15.8%-about 17.2% by weight blowing agent, about 23.6%-about 25.8% by weight acid-source agent, and about 0.4%-about 8.8% by weight inorganic filler.

In an eleventh embodiment of the first aspect, the inorganic filler has an average particle size of about 10 nm-about 500 nm.

In a twelfth embodiment of the first aspect, the non-intumescent composition comprises about 1.6%-about 2.8% by weight aliphatic amine based curing agent with a viscosity of about 5,000-about 15,000 centipoise at 25° C., about 4.1%-about 7.1% by weight waterborne epoxy resin with a viscosity of about 400-about 750 centipoise at 25° C., about 39.5%-about 65.7% by weight fly ash, about 0.3%-about 10.3% by weight slag, about 2.0%-about 2.8% by weight sodium hydroxide, about 14.4%-about 27.6% by weight sodium silicate solution, and about 1.5%-about 20.3% by weight water; and the intumescent composition comprises about 6.2%-about 6.6% by weight aliphatic amine based curing agent with a viscosity of about 5,000-about 15,000 centipoise at 25° C., about 15.3%-about 16.7% by weight waterborne epoxy resin with a viscosity of about 400-about 750 centipoise at 25° C., about 11.8%-about 13.0% by weight pentaerythritol, about 15.8%-about 17.2% by weight melamine, about 23.6%-about 25.8% by weight ammonium polyphosphate, about 0.4%-about 4.4% by weight magnesium hydroxide, about 0.4%-about 4.4% by weight aluminum hydroxide, and about 5.2%-about 33.2% by weight water.

In a thirteenth embodiment of the first aspect, the magnesium hydroxide has an average particle size of about 110 nm-about 500 nm, and the aluminum hydroxide has an average particle size of about 10 nm-about 500 nm.

In a second aspect of the present disclosure, provided herein is a method of preparing the fire retardant composition of the first aspect, comprising the steps of: a) mixing a curable binder composition, at least one non-intumescent fire retardant ingredient, and at least one reaction enhancing additive thereby forming a non-intumescent composition; and b) mixing a curable binder composition, at least one intumescent fire retardant ingredients, and at least one inorganic fillers thereby forming an intumescent composition.

In a third aspect of the present disclosure, provided herein is a fire retardant coating comprising a first layer 2 and a second layer 3, wherein the first layer 2 is formed by the non-intumescent composition of the first aspect of the present disclosure, and the second layer 3 is formed by the intumescent composition of the first aspect of the present disclosure.

In a first embodiment of the third aspect, the non-intumescent composition comprises about 1.6%-about 2.8% by weight aliphatic amine based curing agent with a viscosity of about 5,000-about 15,000 centipoise at 25° C., about 4.1%-about 7.1% by weight waterborne epoxy resin with a viscosity of about 400-about 750 centipoise at 25° C., about 39.5%-about 65.7% by weight fly ash, about 0.3%-about 10.3% by weight slag, about 2.0%-about 2.8% by weight sodium hydroxide, about 14.4%-about 27.6% by weight sodium silicate solution, and about 1.5%-about 20.3% by weight water; and the intumescent composition comprises about 6.2%-about 6.6% by weight aliphatic amine based curing agent with a viscosity of about 5,000-about 15,000 centipoise at 25° C., about 15.3%-about 16.7% by weight waterborne epoxy resin with a viscosity of about 400-about 750 centipoise at 25° C., about 11.8%-about 13.0% by weight pentaerythritol, about 15.8%-about 17.2% by weight melamine, about 23.6%-about 25.8% by weight ammonium polyphosphate, about 0.4%-about 4.4% by weight magnesium hydroxide, about 0.4%-about 4.4% by weight aluminum hydroxide, and about 5.2%-about 33.2% by weight water.

In a second embodiment of the third aspect, the magnesium hydroxide has an average particle size of about 10 nm-about 500 nm, and the aluminum hydroxide has an average particle size of about 10 nm-about 500 nm.

In a third embodiment of the third aspect, the fire retardant coating further comprises a third layer 4, wherein the third layer 4 is formed by an anti-weathering composition.

In a fourth embodiment of the third aspect, the anti-weathering composition comprises about 4.81%-about 6.81% by weight vinyl silicone oil with a viscosity of about 95,000 centipoise-about 105,000 centipoise, about 86.09%-about 88.09% by weight vinyl silicone oil with a viscosity of about 400 centipoise-about 600 centipoise, about 0.005%-about 0.015% by weight platinum catalyst, about 0.08%- about 0.28% by weight 1-ethynyl-1-cyclohexanol, and about 5.91%-about 7.91% by weight hydrogen silicone oil with a viscosity of about 70 centipoise-about 110 centipoise.

The fire retardant coatings and/or materials of the present disclosure can be applied at a wide range of temperatures and on a wide range of materials (e.g. steel, concrete, wood, and plastic) with good fire retardancy, strong adhesiveness, good scratch resistance, good hardness, and are environmentally friendly (e.g. utilize solid waste materials to reduce environmental burdens and contain very little toxic substances after burning) and aesthetically appealing (e.g. smooth and even surface with adjustable colors). In addition, the fire retardant compositions can be prepared at ambient temperature within a short time, e.g. less than 20 min, and such compositions can be applied onto a variety of substrate materials using conventional methods, such as spray, rolling, brushing, troweling, etc. Moreover, the fire retardant coatings formed by the compositions of the present disclosure can be dried at ambient temperature in a short period of time, e.g. less than 4 hours.

In particular, the fire retardant coatings of the present disclosure can pass BS476 (Standard for Safety of Flammability: fire test on building materials and structures) for steel, concrete and wood substrates and UL 94 (Standard for Safety of Flammability of Plastic Materials for Parts in Devices and Appliances testing) for plastic substrates.

Advantageously, the content of lead (Pb), mercury (Hg), cadmium (Cd), hexavalent chromium ($Cr^{6+}$), polybrominated biphenyls (PBB), polybrominated diphenyl ether (PBDE), bis(2-ethylhexyl), phthalate (DEHP), butyl benzyl phthalate (BBP), dibutyl phthalate (DBP) and diisobutyl phthalate (DIBP) in the fire retardant coatings of the present disclosure are lower than the limit as set in the Restriction of Hazardous Substances: RoHS Directive (EU) 2015/863 amending Annex II to Directive 2011/65/EU.

In addition, the volatile organic compound (VOC) content of the fire retardant coating of the present disclosure can be as low (8 g/L) and complies with environmental regulation. This shows that the fire retardant coating of the present disclosure is even more environmental-friendly than the existing products.

Tape tests have also been performed to the fire retardant coating of the present disclosure by attempting to remove the coating with tape after the coating is cut with cutting tool, and the test results confirmed that the developed fire retardant coating can have good adhesion (up to 4B) to a broad range of substrates, such as steel, concrete, wood and plastic.

Pencil tests have been performed to the fire retardant coating of the present disclosure by pushing pencils of known hardness over the coating in order to obtain the coating hardness, and the test results confirmed that the developed fire retardant coating can have good hardness, e.g., up to 2H.

Scratch tests have been performed to the fire retardant coating of the present disclosure by scratching the coating with a scratch stylus loaded with a specified load and checking if there is any scratch on the coating surface by naked eyes and/or microscope, and the test results confirmed that the fire retardant coating of the present disclosure can have good scratch resistance, e.g., up to 2H.

In order to improve the application of a fire retardant coating, it should have good rapid drying. Drying tests have been performed on the fire retardant coatings described herein, e.g. by touching the surface after drying less than 4 hours and checking if there is any imprint on the coating surface by naked eye and/or microscope. The test results confirmed that the retardant coatings described herein have good rapid drying.

BRIEF DESCRIPTION OF DRAWINGS

It should be understood that the drawings described herein are for illustration purposes only. The drawings are not necessarily to scale, with emphasis generally being placed upon illustrating the principles of the present teachings. The drawings are not intended to limit the scope of the present teachings in any way.

DETAILED DESCRIPTION

The present disclosure relates to a fire retardant composition comprising a non-intumescent composition and an intumescent composition. The non-intumescent composition comprises a curable binder composition, at least one non-intumescent fire retardant ingredient, and at least one reaction enhancing additive. In certain embodiments, the non-intumescent composition further comprises at least one inorganic filler. The intumescent composition comprises a curable binder composition, at least one intumescent fire retardant ingredient, and at least one inorganic filler. The fire retardant composition can comprise more than one non-intumescent composition and more than one intumescent composition.

In certain embodiments, the at least one inorganic filler of the non-intumescent composition and the at least one inorganic filler of the intumescent composition are the same. In certain embodiments, the at least one inorganic filler of the non-intumescent composition and the at least one inorganic filler of the intumescent composition are different.

In certain embodiments, the curable binder composition of the non-intumescent composition and the curable binder composition of the intumescent composition are the same. In certain embodiments, the curable binder composition of the non-intumescent composition and the curable binder composition of the intumescent composition are different.

In certain embodiments, the fire retardant composition further comprises an anti-weathering composition. In certain embodiments, the anti-weathering composition is transparent. In certain embodiments, the anti-weathering composition comprises at least one dye, such as titanium dioxide.

In certain embodiments, the anti-weathering composition comprises at least one vinyl silicone oil, a catalyst (e.g. 1-ethynyl-1-cyclohexanol, chloroplatinic acid, triphenylphosphine complex of platinum of the formula Pt[P$(C_6H_5)_3$]), an inhibitor (e.g. 1-ethynyl-1-cyclohexanol), and a hydrogen silicone oil. Any other fire retardant anti-weathering compositions known in the art are also within the contemplation of the present disclosure.

The non-intumescent composition of the present disclosure can form a first layer 2 of the fire retardant coating that directly contacts the substrate 1, such as steel, concrete, wood, or plastic. The intumescent composition of the present disclosure can form a second layer 3 of the fire retardant coating that is on top of the first non-intumescent layer 2. The optional anti-weathering composition of the present disclosure can form a third layer 4 of the fire retardant coating that is on top of the second intumescent layer 3. The thickness of each layer can be varied based on the required level of fire retardancy, the required appearance, and/or the budget. The thickness of the first level can be about 0.1 mm-about 5 mm.

In certain embodiments, the percentage by weight of the curable binder composition relative to the non-intumescent composition is about 1%-about 80%, about 5%-about 75%, about 10%-about 70%, about 15%-about 65%, about 20%-about 60%, about 25%-about 55%, about 30%-about 50%, about 35%-about 45%, or about 40%. In certain embodiments, the percentage by weight of the curable binder composition relative to the non-intumescent composition is about 1.6%-about 9.9%, about 2.6%-about 8.9%, about 3.6%-about 7.9%, about 4.6%-about 6.9%, about 5.6%-about 5.9%, or 7.8%.

In certain embodiments, the percentage by weight of the at least one non-intumescent fire retardant ingredient relative to the non-intumescent composition is about 1%-about 80%, about 5%-about 75%, about 10%-about 70%, about 15%-about 65%, about 20%-about 60%, about 25%-about 55%, about 30%-about 50%, about 35%-about 45%, or about 40%. In certain embodiments, the percentage by weight of the at least one non-intumescent fire retardant ingredient relative to the non-intumescent composition is about 0.3%-about 76.0%, about 5.3%-about 71.0%, about 10.3%-about 66.0%, about 15.3%-about 61.0%, about 20.3%-about 56.0%, about 25.3%-about 51.0%, about 30.3%-about 46.0%, about 35.3%-about 41.0%, or about 57.9%.

In certain embodiments, the percentage by weight of the at least one reaction enhancing additive relative to the non-intumescent composition is about 1%-about 35%, about 5%-about 30%, about 10%-about 25%, or about 15%-about 20%. In certain embodiments, the percentage by weight of the at least one reaction enhancing additive relative to the non-intumescent composition is about 2.0%-about 30.4%, about 7.0%-about 25.4%, about 12.0%-about 20.4%, or about 23.4%.

In certain embodiments, the percentage by weight of the at least one inorganic filler relative to the non-intumescent composition is about 0%-about 25%, about 5%-about 20%, or about 10%-about 15%.

In certain embodiments, the percentage by weight of the curable binder composition relative to the intumescent composition is about 1%-about 80%, about 5%-about 75%, about 10%-about 70%, about 15%-about 65%, about 20%-about 60%, about 25%-about 55%, about 30%-about 50%, about 35%-about 45%, or about 40%. In certain embodiments, the percentage by weight of the curable binder composition relative to the intumescent composition is about 6.2%-about 26.9%, about 11.2%-about 21.9%, or about 22.4%.

In certain embodiments, the percentage by weight of the at least one intumescent fire retardant ingredient relative to the intumescent composition is about 5%-about 90%, about 10%-about 85%, about 15%-about 80%, about 20%-about 75%, about 25%-about 70%, about 30%-about 65%, about 35%-about 60%, about 40%-about 55%, or about 45%. In certain embodiments, the percentage by weight of the at least one intumescent fire retardant ingredient relative to the intumescent composition is about 11.8%-about 56.0%, about 16.8%-about 51.0%, about 21.8%-about 46.0%, about 26.8%-about 41.0%, about 31.8%-about 36.0%, or about 53.6%.

In certain embodiments, the percentage by weight of the at least one inorganic filler relative to the intumescent composition is about 0%-about 10%, about 1%-about 9%, about 2%-about 8%, about 3%-about 7%, about 4%-about 6%, or about 5%. In certain embodiments, the percentage by weight of the at least one inorganic filler relative to the intumescent composition is about 0.4%-about 8.8%, about 1.4%-about 7.8%, about 2.4%-about 6.8%, about 3.4%-about 5.8%, about 4.4%-about 4.8%, or about 4.8%.

In certain embodiments, the non-intumescent composition comprises about 1.6%-about 9.9% by weight curable binder composition, about 0.3%-about 76.0% by weight non-intumescent ingredients, and about 2.0%-about 30.4% by weight reaction enhancing additive.

In certain embodiments, the intumescent composition comprises about 6.2%-about 26.9% by weight curable binder composition, about 11.8%-about 56.0% by weight intumescent ingredients, and about 0.4%-about 8.8% by weight inorganic filler.

In certain embodiments, the fire retardant composition comprises a non-intumescent composition and an intumescent composition, wherein the non-intumescent composition comprises about 1.6%-about 9.9% by weight curable binder composition, about 0.3%-about 76.0% by weight non-intumescent ingredients, and about 2.0%-about 30.4% by weight reaction enhancing additive; and the intumescent composition comprises about 6.2%-about 26.9% by weight curable binder composition, about 11.8%-about 56.0% by weight intumescent ingredients, and about 0.4%-about 8.8% by weight inorganic filler.

In certain embodiments, the percentage by weight of the large molecular weight vinyl silicone oil relative to the anti-weathering composition is about 1%-about 20%, about 5%-about 15%, or about 10%. In certain embodiments, the percentage by weight of the large molecular weight vinyl silicone oil relative to the anti-weathering composition is about 4.81%-about 6.81%, or about 5.81%.

In certain embodiments, the percentage by weight of the low molecular weight vinyl silicone oil relative to the anti-weathering composition is about 10%-about 90%, about 15%-about 85%, about 20%-about 80%, about 25%-about 75%, about 30%-about 70%, about 35%-about 65%, about 40%-about 60%, about 45%-about 55%, or about 50%. In certain embodiments, the percentage by weight of the low molecular weight vinyl silicone oil relative to the anti-weathering composition is about 86.09%-about 88.09%, or about 87.09%.

In certain embodiments, the percentage by weight of the catalyst relative to the anti-weathering composition is about 0.005%-about 0.05%, about 0.01%-about 0.04%, or about 0.02%-about 0.03%. In certain embodiments, the percentage by weight of the catalyst relative to the anti-weathering composition is about 0.005%-about 0.015%, or about 0.01%.

In certain embodiments, the percentage by weight of the inhibitor relative to the anti-weathering composition is about 0.05%-about 0.5%, about 0.1%-about 0.4%, or about 0.2%-about 0.3%. In certain embodiments, the percentage by weight of the inhibitor relative to the anti-weathering composition is about 0.08%-about 0.28%, or about 0.18%.

In certain embodiments, the percentage by weight of the hydrogen silicon oil relative to the anti-weathering composition is about 1%-about 20%, about 5%-about 15%, or about 10%. In certain embodiments, the percentage by weight of the hydrogen silicon oil relative to the anti-weathering composition is about 5.91%-about 7.91%, or about 6.91%.

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of." Unless specified otherwise, all values provided herein include up to and including the endpoints given, and the values of the constituents or components of the compositions are expressed in weight percent or % by weight of each ingredient in the composition.

As used herein, the term "about" when used in connection with a numerical value refers to a range of numerical values ±5% of the specified numerical value. In certain embodiments, "about" when used in connection with a numerical value can refer to the specified numerical value or +5%, +4.5%, +4%, +3.5%, +3%, +2.5%, +2%, +1.5%, +1%, +0.5%, −0.5%, −1%, −1.5%, −2%, −2.5%, −3%, −3.5%, −4%, −4.5%, or −5% of the specified numerical value.

The term "intumescent" as used herein is a broad term, and is to be given its ordinary and customary meaning to a person having ordinary skill in the art (and is not to be limited to a special or customized meaning), and refers without limitation to a substance which swells or expands as a result of heat exposure, thus increasing in volume. The swelling or expansion of the substance can be a result of chemical reaction under heat or a result of physical configurational change under heat.

The term "non-intumescent" as used herein refers without limitation to a substance that exhibits less than 10 percent free expansion in thickness as a result of heat exposure. Some non-intumescent substances expand less than 8 percent, less than 6 percent, less than 4 percent, less than 2 percent, or less than 1 percent, when exposed to heat and/or fire. The substance can be a natural substance or an artificial substance. The substance can be a chemical compound, a mixture of chemical compounds, and/or a material with defined shapes, e.g. a layer, a bulk, etc.

As used herein, the term "epoxy resin" refers to a compound or mixture containing, on an average, greater than one 1,2-epoxy group per molecule, which can be crosslinked or cured into a final form by means of a chemical reaction with a variety of crosslinking/curing agents used with or without heat. Typically, the 1,2-epoxy group is a glycidyl residue, such as is found in glycidyl ethers, glycidyl esters or glycidyl amines. Examples of epoxy resins include, but not limited to, bisphenol A diglycidyl ether and tetraglycidyl methylenedianiline.

The term "curable" as used herein refers to the ability of a compound or composition that can be converted from a raw material into a finished and useful condition, where the raw material is generally in a liquid state and the finished and useful condition is generally in a solid state. The "curable binder composition" can be a raw resin that can be cured by heat, or can contain a raw resin and a curing agent that can be cured at ambient temperature or any other working temperatures. The term "curing" as used herein refers to a process that converts a raw resin product to a finished and useful condition, usually by application of heat and/or chemicals which induce physico-chemical changes. The term "curing agent" as used herein refers to any of the known curing agents, hardeners, or crosslinking agents for a raw resin material, and includes, but not limited to amines, polyamines, amides, mercaptans, acids, phenolics, anhydrides, Lewis acids and ether and amine complexes thereof, bases, dibasic acids and anhydrides thereof, and/or organic compounds containing one or more hydroxyl groups such as diols, triols, and/or polyols.

The term "layer" throughout the present disclosure, unless the context indicates otherwise, is not limited to a single layer. Where a layer is referred to, it can be a combination of multiple layers. Likewise, where multiple layers are referred to, they can be combined as a single layer.

In certain embodiments, the curable binder composition comprises a curing agent and a resin. In certain embodiments, the curing agent can be an amine-based curing agent. In certain embodiments, the curing agent is an aliphatic amine based curing agent, a cycloaliphatic amine based curing agent, an amido amine and polyamide based curing agent, a phenalkamine and mannich based curing agent, or an aromatic amine based curing agent. Any other curing agents that show high gloss with good color stability, rapid through-cure, good compatibility with pigment pastes and good adhesion are also within the contemplation of the present disclosure. In certain embodiments, the curing agent is an aliphatic amine based curing agent with a viscosity of about 5,000-about 15,000 centipoise at 25° C. In certain embodiments, the curing agent is Huntsman Aradur® 3984 Epoxy Curing Agent.

In certain embodiments, the resin can be epoxy resins, acrylic resins, polyesters, vinyl esters, isocyanate resins, furan resins, any other resins having optimum corrosion resistance, fast drying, excellent adhesion and good flexibility known to the person having ordinary skill in the art, and/or a combination thereof. In certain embodiments, the resin is an epoxy resin. Preferably, the epoxy resin is a liquid epoxy resin at ambient temperature. In certain embodiments, the epoxy resin is a waterborne epoxy resin with a viscosity of about 400-about 750 centipoise at 25° C. In certain embodiments, the epoxy resin is Huntsman Araldite® PZ 3961-1 Epoxy Resin.

In certain embodiments, the at least one non-intumescent fire retardant ingredient is a solid waste material. In certain embodiments, the solid waste material is finely pulverized with an average particle size (in reference to the longest dimension of the particle) of about 1 µm-about 100 µm, about 5-about 95 µm, about 10-about 90 µm, about 15 µm-about 85 µm, about 20 µm-about 80 µm, about 25 µm-about 75, about 30 µm-about 70 µm, about 35 µm-about 65 µm, about 40 µm-about 60 µm, about 45 µm-about 55 µm, or about 50 µm. In certain embodiments, the at least one solid waste material has an average particle size (in reference to the longest dimension of the particle) of about 50 µm-about 75 µm.

In certain embodiments, the at least one solid waste material is fly ash, bottom ash, slag, quartz sand waste residues, broken glasses, any other existing solid waste materials containing fire retardant ingredients, e.g. construction wastes, and/or a combination thereof. In certain embodiments, fly ash can be Class I low calcium fly ash, Class II low calcium fly ash, Class I high calcium fly ash, Class II high calcium fly ash, or a combination thereof. Any other types of fly ash existing in the environment are also within the contemplation of the present disclosure. In certain embodiments, slag can be converter slag, submerged arc furnace slag, ladle slag, slag obtained by selective oxidation of vanadium from raw iron, and/or a combination thereof. Any other types of slag existing in the environment are also within the contemplation of the present disclosure.

In certain embodiments, the at least one reaction enhancing additive is an alkali metal hydroxide, an acid solutions, an alkali metal silicate solution, and/or a combination thereof. The alkali metal hydroxide can be sodium hydroxide, potassium hydroxide, or lithium hydroxide, etc. The acid solution can be diluted sulfuric acid, or diluted hydrochloric acid, etc. The alkali metal silicate solution can be a sodium silicate solution, potassium silicate solution, or lithium silicate solution, etc. The alkali metal silicate solutions can be prepared by dissolving alkali metal oxide and silica at a certain weight percentage ratio in water. In certain embodiments, the weight percentage ratio of alkali metal oxide to silica is 1:10, 1:9.5, 1:9, 1:8.5, 1:8, 1:7.5, 1:7, 1:6.5, 1:6, 1:5.5, 1:5, 1:4.5, 1:4, 1:3.5, 1:3, 1:2.5, 1:2, 1:1.5, or 1:1. In certain embodiments, the alkali metal oxide is sodium oxide. In certain embodiments, the weight percentage ratio of sodium oxide to silica is 2:5. The weight percentage of the alkali metal silicate solution can be 5-50%, 10-45%, 15-40%, 20-35%, or 25-30%. In certain embodiments, the weight percentage of the alkali metal silicate solution is 30%.

In certain embodiments, the non-intumescent composition optionally comprises at least one inorganic filler. The at least one inorganic filler can comprise non-flammable particles with an average particle size (in reference to the longest dimension of the particle) of about 1 µm-about 100 µm, about 5 µm-about 95 µm, about 10-about 90 µm, about 15 µm-about 85 µm, about 20 µm-about 80 µm, about 25 µm-about 75, about 30 µm-about 70 µm, about 35 µm-about 65 µm, about 40 µm-about 60 µm, about 45 µm-about 55 µm, or about 50 µm. In certain embodiments, the optional inorganic fillers for the non-intumescent composition are quartz sand. In certain embodiments, the quartz sand has an average particle size (in reference to the longest dimension of the particle) of about 50 µm-about 75 µm.

In certain embodiments, the at least one intumescent fire retardant ingredient is a carbon-source agent, a blowing agent, an acid-source agent, and/or a combination thereof. In certain embodiments, the carbon-source agent comprises pentaerythritol, dipentaerythritol, tripentaerythritol, starch, dextrin, sorbitol, mannitol, phenol-formaldehyde resin, methylol melamine, or char-forming polymers. In certain embodiments, the carbon-source agent is pentaerythritol. In certain embodiments, the blowing agent comprises melamine, urea, urea formaldehyde, melamine formaldehyde, or dicyandiamide. In certain embodiments, the blowing agent is melamine. In certain embodiments, the acid-source agent comprises phosphoric acid, sulfuric acid, boric acid, ammonium phosphates, ammonium polyphosphates, ammonium borates, ammonium polyborates, ammonium sulfates, ammonium halides, melamine phosphates, melamine pyrophosphates, urea with phosphoric acids, tricresyl phosphates, alkyl phosphates, or haloalkyl phosphates. In certain embodiments, the acid-source agent is ammonium polyphosphates. In certain embodiments, the ammonium polyphosphate is a Phase II ammonium polyphosphate with a polymerization degree of n>1000, purchased from International Laboratory (IL) USA.

In certain embodiments, the at least one inorganic filler of the intumescent composition is a non-flammable nanoparticle with an average particle size (in reference to the longest dimension of the particle) ranging from about 10 nm to about 500 nm, about 20 nm to about 490 nm, about 30 nm to about 480 nm, about 40 nm to about 470 nm, about 50 nm to about 460 nm, about 60 nm to about 450 nm, about 70 nm to about 440 nm, about 80 nm to about 430 nm, about 90 nm to about 420 nm, about 100 nm to about 410 nm, about 110 nm to about 400 nm, about 120 nm to about 390 nm, about 130 nm to about 380 nm, about 140 nm to about 370 nm, about 150 nm to about 360 nm, about 160 nm to about 350 nm, about 170 nm to about 340 nm, about 180 nm to about 330 nm, about 190 nm to about 320 nm, about 200 nm to about 310 nm, about 210 nm to about 300 nm, about 220 nm to about 290 nm, about 230 nm to about 280 nm, about 240 nm to about 270 nm, or about 250 nm to about 260 nm. The high surface area to volume ratio of the at least one inorganic filler can endow improved fire retardancy of the resultant fire retardant coating comprising the non-flammable nanoparticles.

In certain embodiments, the at least one inorganic filler is a metal hydroxide, metal oxide, metal borate, or a combination thereof. In certain embodiments, the metal hydroxide can be sodium hydroxide, magnesium hydroxide, or aluminum hydroxide. In certain embodiments, the metal oxide can be copper (II) oxide, molybdenum oxide, zinc oxide, magnesium oxide, or ferric oxide. In certain embodiments, the metal borate can be sodium borate, magnesium borate, or zinc borate. In certain embodiments, the at least one inorganic filler is magnesium hydroxide. In certain embodiments, the at least one inorganic filler is aluminum hydroxide. In certain embodiments, the at least one inorganic filler are magnesium hydroxide and aluminum hydroxide. The metal hydroxide, e.g. magnesium hydroxide or aluminum hydroxide, can have an average particle size (in reference to the longest dimension of the particle) ranging from about 10 nm to about 500 nm, about 20 nm to about 490 nm, about 30 nm to about 480 nm, about 40 nm to about 470 nm, about 50 nm to about 460 nm, about 60 nm to about 450 nm, about 70 nm to about 440 nm, about 80 nm to about 430 nm, about 90 nm to about 420 nm, about 100 nm to about 410 nm, about 110 nm to about 400 nm, about 120 nm to about 390 nm, about 130 nm to about 380 nm, about 140 nm to about 370 nm, about 150 nm to about 360 nm, about 160 nm to about 350 nm, about 170 nm to about 340 nm, about 180 nm to about 330 nm, about 190 nm to about 320 nm, about 200 nm to about 310 nm, about 210 nm to about 300 nm, about 220 nm to about 290 nm, about 230 nm to about 280 nm, about 240 nm to about 270 nm, or about 250 nm to about 260 nm.

In certain embodiments, the percentage by weight of the curing agent relative to the non-intumescent composition is about 1%-about 5%, about 2%-about 4%, or about 3%. In certain embodiments, the percentage by weight of the curing agent relative to the non-intumescent composition is about 1.6%-about 2.8%, about 1.8%-about 2.6%, about 2.0%-about 2.4%, or about 2.2%.

In certain embodiments, the percentage by weight of the resin relative to the non-intumescent composition is about 2%-about 8%, about 3%-about 7%, about 4%-about 6%, or about 5%. In certain embodiments, the percentage by weight of the resin relative to the non-intumescent composition is about 4.1%-about 7.1%, about 4.6%-about 6.6%, about 5.1%-about 6.5%, or about 5.6%.

In certain embodiments, the percentage by weight of the fly ash relative to the non-intumescent composition is about 30%-about 70%, about 35%-about 65%, about 40%-about 60%, about 45%-about 55%, or about 50%. In certain embodiments, the percentage by weight of the fly ash relative to the non-intumescent composition is about 39.5%-about 65.7%, about 44.5%-about 60.7%, about 49.5%-about 55.7%, or about 52.6%.

In certain embodiments, the percentage by weight of the slag relative to the non-intumescent composition is about 1%-about 10%, about 2%-about 9%, about 3%-about 8%, about 4%-about 7%, or about 5%-about 6%. In certain embodiments, the percentage by weight of the slag relative to the non-intumescent composition is about 0.3%-about 10.3%, about 2.3%-about 8.3%, about 4.3%-about 6.3%, or about 5.3%.

In certain embodiments, the percentage by weight of the quartz sands relative to the non-intumescent composition is about 0%-about 5%, about 1%-about 4%, or about 2%-about 3%.

In certain embodiments, the percentage by weight of the alkali metal hydroxide relative to the non-intumescent composition is about 1%-about 4%, or about 2%-about 3%. In certain embodiments, the percentage by weight of the alkali metal hydroxide relative to the non-intumescent composition is about 2.0%-about 2.8%, about 2.2%-about 2.6%, or about 2.4%.

In certain embodiments, the percentage by weight of the alkali metal silicate solution relative to the non-intumescent composition is about 10%-about 30%, about 15%-about 25%, or about 20%. In certain embodiments, the percentage by weight of the alkali metal silicate solution relative to the non-intumescent composition is about 14.4%-about 27.6%, about 19.4%-about 22.6%, or about 21.0%.

In certain embodiments, the percentage by weight of the curing agent relative to the intumescent composition is about 2%-about 10%, about 3%-about 9%, about 4%-about 8%, about 5%-about 7%, or about 6%. In certain embodiments, the percentage by weight of the curing agent relative to the intumescent composition is about 4%-about 10%, about 5%-about 9%, about 6%-about 8%, or about 7%. In certain embodiments, the percentage by weight of the curing agent relative to the intumescent composition is about 6.2%-about 6.6%, or about 6.4%.

In certain embodiments, the percentage by weight of the resin relative to the intumescent composition is about 10%-about 22%, about 11%-about 21%, about 12%-about 20%, about 13%-about 19%, about 14%-about 18%, about 15%-about 17%, or about 16%. In certain embodiments, the percentage by weight of the resin relative to the intumescent composition is about 12%-about 20%, about 13%-about 19%, about 14%-about 18%, about 15%-about 17%, or about 16%. In certain embodiments, the percentage by weight of the resin relative to the intumescent composition is about 15.3%-about 16.7%, or about 16.0%.

In certain embodiments, the percentage by weight of the carbon-source agent relative to the intumescent composition is about 5%-about 20%, about 6%-about 19%, about 7%-about 18%, about 8%-about 17%, about 9%-about 16%, about 10%-about 15%, about 11%-about 14%, or about 12%-about 13%. In certain embodiments, the percentage by weight of the carbon-source agent relative to the intumescent composition is about 8%-about 14%, about 9%-about 13%, about 10%-about 12%, or about 11%. In certain embodiments, the percentage by weight of the carbon-source agent relative to the intumescent composition is about 11.8%-about 13.0%, about 12.2%-about 12.6%, or about 12.4%.

In certain embodiments, the percentage by weight of the blowing agent relative to the intumescent composition is about 10%-about 22%, about 11%-about 21%, about 12%-about 20%, about 13%-about 19%, about 14%-about 18%, about 15%-about 17%, or about 16%. In certain embodiments, the percentage by weight of the blowing agent relative to the intumescent composition is about 15.8%-about 17.2%, about 16.2%-about 16.8%, or about 16.5%.

In certain embodiments, the percentage by weight of the acid-source agent relative to the intumescent composition is about 15%-about 35%, about 20%-about 30%, or about 25%. In certain embodiments, the percentage by weight of the acid-source agent relative to the intumescent composition is about 18%-about 26%, about 19%-about 25%, about 20%-about 24%, about 21%-about 23%, or about 22%. In certain embodiments, the percentage by weight of the acid-source agent relative to the intumescent composition is about 23.6%-about 25.8%, about 24.0%-about 25.4%, or about 24.7%.

In certain embodiments, the percentage by weight of the magnesium hydroxide relative to the intumescent composition is about 0%-about 8%, about 1%-about 7%, about 2%-about 6%, about 3%-about 5%, or about 4%. In certain embodiments, the percentage by weight of the magnesium hydroxide relative to the intumescent composition is about 0.4%-about 4.4%, about 1.4%-about 3.4%, or about 2.4%.

In certain embodiments, the percentage by weight of the aluminum hydroxide relative to the intumescent composition is about 0%-about 8%, about 1%-about 7%, about 2%-about 6%, about 3%-about 5%, or about 4%. In certain embodiments, the percentage by weight of the aluminum hydroxide relative to the intumescent composition is about 0.4%-about 4.4%, about 1.4%-about 3.4%, or about 2.4%.

In certain embodiment, the non-intumescent composition of the present disclosure comprises about 1%-about 5% by weight curing agent, about 2%-about 8% by weight resin, about 1%-about 4% by weight alkali metal hydroxide, about 10%-about 30% by weight alkali metal silicate solution, about 30%-about 70% by weight fly ash, about 1%-about 10% by weight slag, about 0%-about 5% by weight quartz sand, and about 5%-about 15% water.

In certain embodiment, the intumescent composition comprises about 2%-about 10% by weight curing agent, about 10%-about 22% by weight resin, about 5%-about 20% by weight carbon-source agent, about 10%-about 22% by weight blowing agent, about 15%-about 35% by weight acid-source agent, about 0%-about 8% by weight magnesium hydroxide, about 0%-about 8% by weight aluminum hydroxide, and about 10%-about 30% water.

In certain embodiments, the large molecular weight vinyl silicone oil of the anti-weathering composition has a viscosity of about 10,000 centipoise-about 300,000 centipoise, about 20,000 centipoise-about 290,000 centipoise, about 30,000 centipoise-about 280,000 centipoise, about 40,000 centipoise-about 270,000 centipoise, about 50,000 centipoise-about 260,000 centipoise, about 60,000 centipoise-about 250,000 centipoise, about 70,000 centipoise-about 240,000 centipoise, about 80,000 centipoise-about 230,000 centipoise, about 90,000 centipoise-about 220,000 centipoise, about 100,000 centipoise-about 210,000 centipoise, about 110,000 centipoise-about 200,000 centipoise, about 120,000 centipoise-about 190,000 centipoise, about 130,000 centipoise-about 180,000 centipoise, about 140,000 centipoise-about 170,000 centipoise, or about 150,000 centipoise-about 160,000 centipoise. In certain embodiments, the large molecular weight vinyl silicone oil of the anti-weathering composition has a viscosity of about 95,000 centipoise-about 105,000 centipoise.

In certain embodiments, the low molecular weight vinyl silicone oil of the anti-weathering composition has a viscosity of about 100 centipoise-about 1,000 centipoise, about 200 centipoise-about 900 centipoise, about 300 centipoise-about 800 centipoise, about 400 centipoise-about 700 centipoise, or about 500 centipoise-about 600 centipoise. In certain embodiments, the low molecular weight vinyl silicone oil of the anti-weathering composition has a viscosity of about 400 centipoise-about 600 centipoise.

In certain embodiments, the hydrogen silicone oil of the anti-weathering composition has a viscosity of about 10 centipoise-about 300 centipoise, about 50 centipoise-about 250 centipoise, about 100 centipoise-about 200 centipoise, or about 150 centipoise. In certain embodiments, the hydrogen silicone oil of the anti-weathering composition has a viscosity of about 70 centipoise-about 110 centipoise.

The present disclosure also provides a method for preparing the fire retardant composition as described above. The method of preparing the fire retardant composition of the present disclosure comprises steps of a) mixing a curable binder composition, at least one non-intumescent fire retardant ingredients, and at least one reaction enhancing additives in a kneader thereby forming a non-intumescent composition; and b) mixing a curable binder composition, at least one intumescent fire retardant ingredients, and at least one inorganic filler thereby forming an intumescent composition. It is noteworthy that the kneader used in the present disclosure is generally used as a reactor for the rubber vulcanization reaction, and has not been used for preparing a fire retardant composition so far. The incorporation of the kneader into the method of the present disclosure achieved unexpectedly homogenous mixture of the highly viscous non-intumescent composition, which cannot be otherwise obtained using conventional mixing methods.

In certain embodiments, the mixing temperature for the non-intumescent composition and the intumescent composition can be about 1-45° C. In certain embodiments, the mixing time for the non-intumescent composition is about 10-60 min. In certain embodiments, the mixing time for the intumescent composition is about 2-10 min. In certain embodiments, the stirring speed for mixing the non-intumescent composition and for mixing the intumescent composition can be about 10-50 rpm. In certain embodiments, the mixing temperature for the non-intumescent composition and the intumescent composition is ambient temperature. In certain embodiments, the mixing time for the non-intumescent composition is about 15-30 min. In certain embodiments, the mixing time for the intumescent composition is about 5 min. In certain embodiments, the stirring speed for mixing the non-intumescent composition and for mixing the intumescent composition is about 20 rpm.

Figure 1:
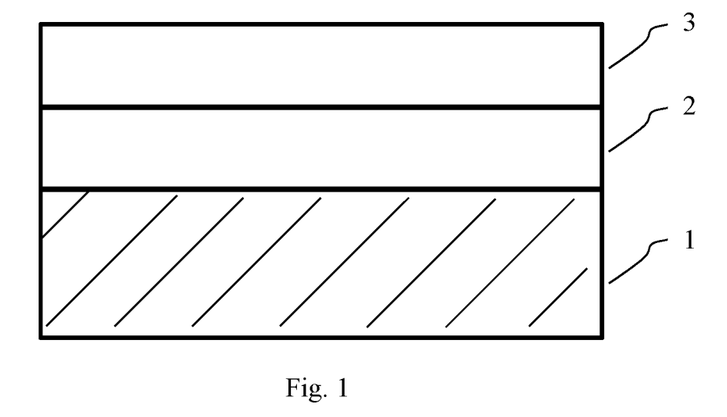
FIG. 1 shows the structure of the fire retardant coating according to certain embodiments described herein.
Figure 2:
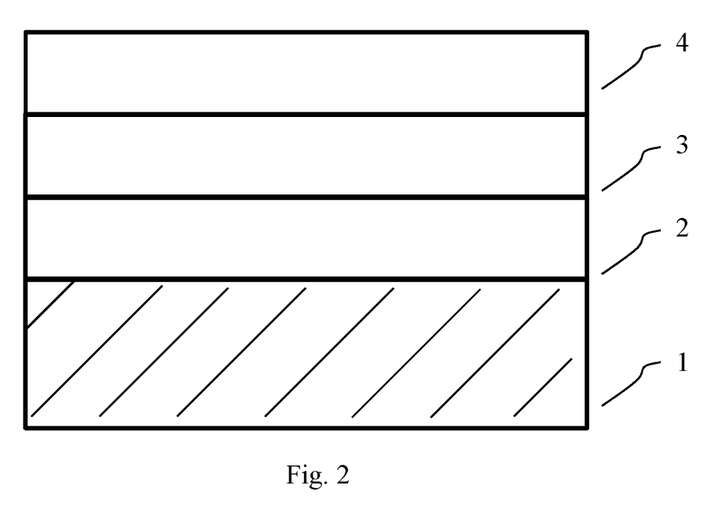
FIG. 2 shows the structure of the fire retardant coating according to certain embodiments described herein.

The present disclosure also provides a fire retardant coating that is formed by the fire retardant composition of the present disclosure. In certain embodiments, the fire retardant coating comprises one or more layers. In certain embodiments, the fire retardant coating comprises two layers, wherein the first layer 2 (or inner layer) is formed by the non-intumescent composition of the fire retardant composition of the present disclosure, and the second layer 3 (or outer layer) is formed by the intumescent composition of the fire retardant composition of the present disclosure, as shown in FIG. 1. In certain embodiments, the fire retardant coating further comprises third layer 4, or a protective layer, on top of the second layer to protect the layers underneath against weathering, such as warm water, salt fog and low concentration acid and alkali erosion, so as to increase the service life of the fire retardant coating of the present disclosure, as shown in FIG. 2. In certain embodiments, the protective layer (or outermost layer) is transparent, so as to keep the original appearance of the layers underneath. In certain embodiments, the protective layer is formed by an anti-weathering composition comprising about 1%-about 20% by weight large molecular weight vinyl silicone oil, about 10%-about 90% by weight low molecular weight vinyl silicone oil, about 0.005%-about 0.05% by weight platinum catalyst, about 0.005%-about 0.5% by weight 1-ethynyl-1-cyclohexanol, and about 1%-about 20% by weight hydrogen silicone oil, or any other compositions that can protect the underneath layers and that do not interfere with the fire retardant properties of the underneath layers.

The present disclosure also provides a kit that includes a first vessel comprising the non-intumescent ingredients described herein, a second vessel comprising an intumescent ingredients described herein, and optionally a third vessel comprising an anti-weathering composition described herein. The kit can further comprise a fourth vessel comprising a curable binder, a fifth vessel comprising a reaction enhancing composition, and a sixth vessel comprising an inorganic filler composition. In certain embodiments, the curable binder comprises at least one curing agent and at least one resin that are contained in two separate containers. In certain embodiments, the curable binder only comprises at least one resin. The reaction enhancing composition can comprise at least one reaction enhancing additive as described above. The inorganic filler composition can comprise at least one inorganic filler as described above. The kit can further comprise instructions for preparing the fire retardant compositions in accordance with the methods described herein.

The following non-limiting examples are illustrative of fire retardant compositions in accordance with the invention:

EXAMPLES

Example 1: Preparation of the Non-Intumescent Composition of the Fire Retardant Composition According to One Embodiment of the Present Disclosure A mixture was prepared with fly ash 52.6%, slag 5.3%, NaOH 2.4%, sodium silicate solution 21.0% (prepared from about 10.6% $Na_2O$ and about 26.5% $SiO_2$, purchased from Sigma-Aldrich), $H_2O$ 10.9%, Huntsman Araldite PZ 3961-1 Epoxy Resin 5.6% and Huntsman Aradur 3984 Epoxy Curing Agent 2.2%. The mixture was mixed by a kneader for about 15-30 mins at ambient temperature at a speed of about 20 rpm, and a homogenous non-intumescent composition was obtained. All the percentages are weight percentages.

Example 2: Preparation of the Non-Intumescent Composition of the Fire Retardant Composition According to Another Embodiment of the Present Disclosure A mixture was prepared with fly ash 39.4%, slag 16.9%, NaOH 1.9%, sodium silicate solution 14.3% (purchased from Sigma-Aldrich), $H_2O$ 17.4%, Huntsman Araldite PZ 3961-1 Epoxy Resin 7.2% and Huntsman Aradur 3984 Epoxy Curing Agent 2.9%. The mixture was mixed by a kneader for about 15-30 mins at ambient temperature at a speed of about 20 rpm, and a homogenous non-intumescent composition was obtained. All the percentages are weight percentages.

Example 3: Preparation of the Intumescent Composition of the Fire Retardant Composition According to One Embodiment of the Present Disclosure Preparation of Magnesium Hydroxide.

A 0.1M magnesium chloride aqueous solution was prepared by dissolving 1.626 g magnesium chloride hexahydrate in 80 mL deionized water to form solution A.

An aqueous solution with 2% (w/w) polyethylene glycol with respect to the amount of magnesium chloride in Solution A was prepared by dissolving 0.0152 g polyethylene glycol (MW 6000) in 80 mL deionized water to form solution B.

A 0.25M ammonia aqueous solution was prepared by mixing 1.109 g ammonia water in solution B to form solution C.

Under vigorous stirring, all of the solution A was transferred to solution C at once, and the vigorous stirring was continued for an hour. The final product was filtered and rinsed, followed by drying in a vacuum oven to obtain the magnesium hydroxide.

Preparation of Aluminum Hydroxide.

A 0.02M aluminium chloride aqueous solution was prepared by dissolving 0.386 g aluminium chloride hexahydrate in 80 mL deionized water to form solution A.

A 0.06M sodium hydroxide solution was prepared by dissolving 0.192 g sodium hydroxide in 80 mL deionized water to form solution B.

Under vigorous stirring, all of the solution A was added to the solution B at once and the reaction lasted for 60 mins. Following this, the solution was gently stirred overnight for aging. The final product was filtered and rinsed, and dried to obtain the aluminum hydroxide.

Preparation of the Intumescent Composition According to One Embodiment

A mixture of Huntsman Araldite PZ 3961-1 Epoxy Resin 16.0%, Huntsman Aradur 3984 Epoxy Curing Agent 6.4%, water 19.2%, pentaerythritol (purchased from Sigma-Aldrich) 12.4%, melamine (purchased from Sigma-Aldrich) 16.5%, ammonium polyphosphate (purchased from International Laboratory (IL) USA) 24.7%, nano-magnesium hydroxide 2.4% and nano-aluminum hydroxide 2.4% was prepared by stirring thoroughly for about 5 minutes at ambient temperature at a speed of about 20 rpm to obtain a homogeneous mixture, which was then filtered by a sieve with openings of 35 mesh to remove large particles from the mixture.

Example 4: Preparation of the Intumescent Composition of the Fire Retardant Composition According to Another Embodiment of the Present Disclosure

The magnesium hydroxide and the aluminum hydroxide were prepared using the same methods as described in Example 3.

A mixture of Huntsman Araldite PZ 3961-1 Epoxy Resin 15.2%, Huntsman Aradur 3984 Epoxy Curing Agent 6.1%, water 12.2%, pentaerythritol (purchased from Sigma-Aldrich) 11.7%, melamine (purchased from Sigma-Aldrich) 15.7%, ammonium polyphosphate (purchased from International Laboratory (IL) USA) 23.5%, nano-magnesium hydroxide 7.8% and aluminum hydroxide 7.8% was prepared by stirring thoroughly for about 5 minutes at ambient temperature at a speed of about 20 rpm to obtain a homogeneous mixture, and then filtered by sieve with openings of 35 mesh to remove large particles from the mixture.

Example 5: Preparation of the Anti-Weathering Composition According to One Embodiment of the Present Disclosure

Platinum catalyst was prepared first by dissolving divinyl tetramethyl disiloxane into isopropanol under nitrogen, and then mixing with $H_2PtCl_6.6H_2O$ and sodium bicarbonate until the color was changed from deep yellow to white. After the solids were filtered away, the filtrate was mixed with washing solution, and then the isopropanol and the water inside were removed by vacuum distillation. The platinum catalyst was then obtained by diluting with vinyl-terminated silicone oil.

A mixture of vinyl silicone oil with a viscosity of 100,000±5,000 centipoise comprising a structure of

5.81% vinyl silicone oil with a viscosity of 500±25 centipoise comprising a structure of 87.09% platinum catalyst (e.g. $H_2PtCl_6$-complex) 0.01%, inhibitor 1-ethynyl-1-cyclohexanol 0.18%, and hydrogen silicone oil with a viscosity of 70~110 centipoise comprising a structure of 6.91% was prepared by stirring to obtain a homogeneous mixture of anti-weathering composition.

Example 6: Testing Results of the Fire Retardant Coatings Comprising the Non-Intumescent Composition of Example 1 and the Intumescent Composition of Example 3

Fire retardancy rating: BS 476 "Class 1" and UL 94 "Class 0".

The BS 476 Standard for Safety of flammability: Fire test on building materials and structures was used for fire test of the coatings on steel, concrete and wood substrates. The UL94 Standard for Safety of Flammability of Plastic Materials for Parts in Devices and Appliances testing was used for fire test of the coatings on plastic substrates.

Environmental Friendliness Testing

Restriction of Hazardous Substances (RoHS Directive (EU) 2015/863 amending Annex II to Directive 2011/65/EU): Pass.

VOC content (USEPA Method 24 Determination of volatile matter content, water content, density, volume solids, and weight solids of surface coatings): Low VOC (~8 g/L).

Adhesion testing (ASTM D3359 Standard Test Methods for Measuring Adhesion by Tape Test): 4B.

Hardness testing (ASTM D3363 Standard Test Method for Film Hardness by Pencil Test): 2H.

Scratch resistance (ASTM D3363 Standard Test Method for Film Hardness by Pencil Test): up to 2H.

Appearance: smooth surface.

Example 7: Testing Results of the Fire Retardant Coatings Comprising the Non-Intumescent Composition of Example 1 and the Intumescent Composition of Example 4

Fire retardancy rating: BS 476 "Class 1" and UL 94 "Class 0".

The BS 476 Standard for Safety of flammability: Fire test on building materials and structures was used for fire test of the coatings on steel, concrete and wood substrates. The UL94 Standard for Safety of Flammability of Plastic Materials for Parts in Devices and Appliances testing was used for fire test of the coatings on plastic substrates.

Environmental Friendliness Testing

Restriction of Hazardous Substances (RoHS Directive (EU) 2015/863 amending Annex II to Directive 2011/65/EU): Pass.

VOC content (USEPA Method 24 Determination of volatile matter content, water content, density, volume solids, and weight solids of surface coatings): Low VOC (~8 g/L).

Adhesion testing (ASTM D3359 Standard Test Methods for Measuring Adhesion by Tape Test): 4B.

Hardness testing (ASTM D3363 Standard Test Method for Film Hardness by Pencil Test): 2H.

Scratch resistance (ASTM D3363 Standard Test Method for Film Hardness by Pencil Test): up to 2H.

Appearance: relatively less smooth surface as compared to the fire retardant coating of Example 6.

Example 8: Testing Results of the Fire Retardant Coatings Comprising the Non-Intumescent Composition of Example 2 and the Intumescent Composition of Example 3

Fire retardancy rating: BS 476 "Class 1" and UL 94 "Class 0".

The BS 476 Standard for Safety of flammability: Fire test on building materials and structures was used for fire test of the coatings on steel, concrete and wood substrates. The UL94 Standard for Safety of Flammability of Plastic Materials for Parts in Devices and Appliances testing was used for fire test of the coatings on plastic substrates.

Environmental Friendliness Testing

Restriction of Hazardous Substances (RoHS Directive (EU) 2015/863 amending Annex II to Directive 2011/65/EU): Pass.

VOC content (USEPA Method 24 Determination of volatile matter content, water content, density, volume solids, and weight solids of surface coatings): Low VOC (~8 g/L).

Adhesion testing (ASTM D3359 Standard Test Methods for Measuring Adhesion by Tape Test): 4B. Adhesion between non-intumescent layer and intumescent layer: 3B to 4B.

Hardness testing (ASTM D3363 Standard Test Method for Film Hardness by Pencil Test): 2H.

Scratch resistance (ASTM D3363 Standard Test Method for Film Hardness by Pencil Test): up to 2H.

Example 9: Testing Results of the Fire Retardant Coatings Comprising the Non-Intumescent Composition of Example 1, the Intumescent Composition of Example 3, and the Anti-Weathering Composition of Example 5

Fire retardancy rating: BS 476 "Class 1" and UL 94 "Class 0".

The BS 476 Standard for Safety of flammability: Fire test on building materials and structures was used for fire test of the coatings on steel, concrete and wood substrates. The UL94 Standard for Safety of Flammability of Plastic Materials for Parts in Devices and Appliances testing was used for fire test of the coatings on plastic substrates.

Environmental Friendliness Testing

Restriction of Hazardous Substances (RoHS Directive (EU) 2015/863 amending Annex II to Directive 2011/65/EU): Pass.

VOC content (USEPA Method 24 Determination of volatile matter content, water content, density, volume solids, and weight solids of surface coatings): Low VOC (~8 g/L).

Adhesion testing (ASTM D3359 Standard Test Methods for Measuring Adhesion by Tape Test): 5B (adhesion between the anti-weathering layer and the intumescent layer).

Hardness testing (ASTM D3363 Standard Test Method for Film Hardness by Pencil Test): HB.

What is claimed is:

1. A fire retardant composition comprising at least one non-intumescent composition and at least one intumescent composition, wherein:
    the at least one non-intumescent composition comprises a curable binder composition, at least one non-intumescent fire retardant ingredient, and at least one reaction enhancing additive; and
    the at least one intumescent composition comprises a curable binder composition, at least one intumescent fire retardant ingredient, and at least one inorganic filler,
wherein the at least one non-intumescent composition comprises about 1.6%-about 2.8% by weight curing agent, about 4.1%-about 7.1% by weight resin, about 0.3%-about 76.0% by weight of the at least one intumescent fire retardant ingredient, wherein the at least one intumescent fire retardant ingredient is a solid waste material, about 2.0%-about 2.8% by weight alkali metal hydroxide, and about 14.4%-about 27.6% by weight alkali metal silicate solution; and the at least one intumescent composition comprises about 6.2%-about 6.6% by weight curing agent, about 15.3%-about 16.7% by weight resin, about 11.8%-about 13.0% by weight carbon-source agent, about 15.8%-about 17.2% by weight blowing agent, about 23.6%-about 25.8% by weight acid-source agent, and about 0.4%-about 8.8% by weight inorganic filler.

2. The fire retardant composition of claim 1, wherein the curable binder composition comprises a curing agent and a resin.

3. The fire retardant composition of claim 2, wherein the curing agent is an aliphatic amine based curing agent with a viscosity of about 5,000-about 15,000 centipoise at 25° C.

4. The fire retardant composition of claim 2, wherein the resin is a waterborne epoxy resin with a viscosity of about 400-about 750 centipoise at 25° C.

5. The fire retardant composition of claim 1, wherein the solid waste material is selected from the group consisting of fly ash, broken glass, kaolin, and slag.

6. The fire retardant composition of claim 1, wherein the at least one inorganic filler is a metal hydroxide with an average particle size of about 10 nm-about 500 nm.

7. The fire retardant composition of claim 1 further comprising an anti-weathering composition.

8. The fire retardant composition of claim 1, wherein the inorganic filler has an average particle size of about 10 nm-about 500 nm.

9. The fire retardant composition of claim 1, wherein the non-intumescent composition comprises about 39.5%-about 65.7% by weight fly ash and about 0.3%-about 10.3% by weight slag.

10. The fire retardant composition of claim 9, wherein the inorganic filler an average particle size of about 10 nm-about 500 nm.

11. The fire retardant composition of claim 1, wherein the non-intumescent composition comprises about 1.6%-about 2.8% by weight aliphatic amine based curing agent with a viscosity of about 5,000-about 15,000 centipoise at 25° C., about 4.1%-about 7.1% by weight waterborne epoxy resin with a viscosity of about 400-about 750 centipoise at 25° C., about 39.5%-about 65.7% by weight fly ash, about 0.3%-about 10.3% by weight slag, about 2.0%-about 2.8% by weight sodium hydroxide, about 14.4%-about 27.6% by weight sodium silicate solution, and about 1.5%-about 20.3% by weight water; and the intumescent composition comprises about 6.2%-about 6.6% by weight aliphatic amine based curing agent with a viscosity of about 5,000-about 15,000 centipoise at 25° C., about 15.3%-about 16.7% by weight waterborne epoxy resin with a viscosity of about 400-about 750 centipoise at 25° C., about 11.8%-about 13.0% by weight pentaerythritol, about 15.8%-about 17.2% by weight melamine, about 23.6%-about 25.8% by weight ammonium polyphosphate, about 0.4%-about 4.4% by weight magnesium hydroxide, about 0.4%-about 4.4% by weight aluminum hydroxide, and about 5.2%-about 33.2% by weight water.

12. The fire retardant composition of claim 11, wherein the magnesium hydroxide has an average particle size of about 10 nm-about 500 nm, and the aluminum hydroxide has an average particle size of about 10 nm-about 500 nm.

13. A method of preparing the fire retardant composition of claim 1, comprising the steps of:
    a. mixing a curable binder composition, at least one non-intumescent fire retardant ingredient, and at least one reaction enhancing additive thereby forming a non-intumescent composition; and
    b. mixing a curable binder composition, at least one intumescent fire retardant ingredients, and at least one inorganic fillers thereby forming an intumescent composition.

14. A fire retardant coating comprising a first layer (2) and a second layer (3), wherein the first layer (2) is formed by the non-intumescent composition of claim 1, and the second layer (3) is formed by the intumescent composition of claim 1.

15. The fire retardant coating of claim 14, wherein the non-intumescent composition comprises about 1.6%-about 2.8% by weight aliphatic amine based curing agent with a viscosity of about 5,000-about 15,000 centipoise at 25° C., about 4.1%-about 7.1% by weight waterborne epoxy resin with a viscosity of about 400-about 750 centipoise at 25° C., about 39.5%-about 65.7% by weight fly ash, about 0.3%-about 10.3% by weight slag, about 2.0%-about 2.8% by weight sodium hydroxide, about 14.4%-about 27.6% by weight sodium silicate solution, and about 1.5%-about 20.3% by weight water, and the intumescent composition comprises about 6.2%-about 6.6% by weight aliphatic amine based curing agent with a viscosity of about 5,000-about 15,000 centipoise at 25° C., about 15.3%-about 16.7% by weight waterborne epoxy resin with a viscosity of about 400-about 750 centipoise at 25° C., about 11.8%-about 13.0% by weight pentaerythritol, about 15.8%-about 17.2% by weight melamine, about 23.6%-about 25.8% by weight ammonium polyphosphate, about 0.4%-about 4.4% by weight magnesium hydroxide, about 0.4%-about 4.4% by weight aluminum hydroxide, and about 5.2%-about 33.2% by weight water.

16. The fire retardant composition of claim 15, wherein the magnesium hydroxide has an average particle size of about 10 nm-about 500 nm, and the aluminum hydroxide has an average particle size of about 10 nm-about 500 nm.

17. The fire retardant coating of claim 16 further comprising a third layer (4), wherein the third layer (4) is formed by an anti-weathering composition.

18. The fire retardant coating of claim 17, wherein the anti-weathering composition comprises about 4.81%-about 6.81% by weight vinyl silicone oil with a viscosity of about 95,000 centipoise-about 105,000 centipoise, about 86.09%-about 88.09% by weight vinyl silicone oil with a viscosity of about 400 centipoise-about 600 centipoise, about 0.005%-about 0.015% by weight platinum catalyst, about 0.08%-about 0.28% by weight 1-ethynyl-1-cyclohexanol, and about 5.91%-about 7.91% by weight hydrogen silicone oil with a viscosity of about 70 centipoise-about 110 centipoise.

\* \* \* \* \*